Oct. 7, 1941.　　　　R. S. TAYLOR　　　　2,258,077
OILING SYSTEM FOR GEARING
Filed July 28, 1937　　　3 Sheets-Sheet 2

INVENTOR
ROBERT S. TAYLOR
BY Charles S. Evans
HIS ATTORNEY

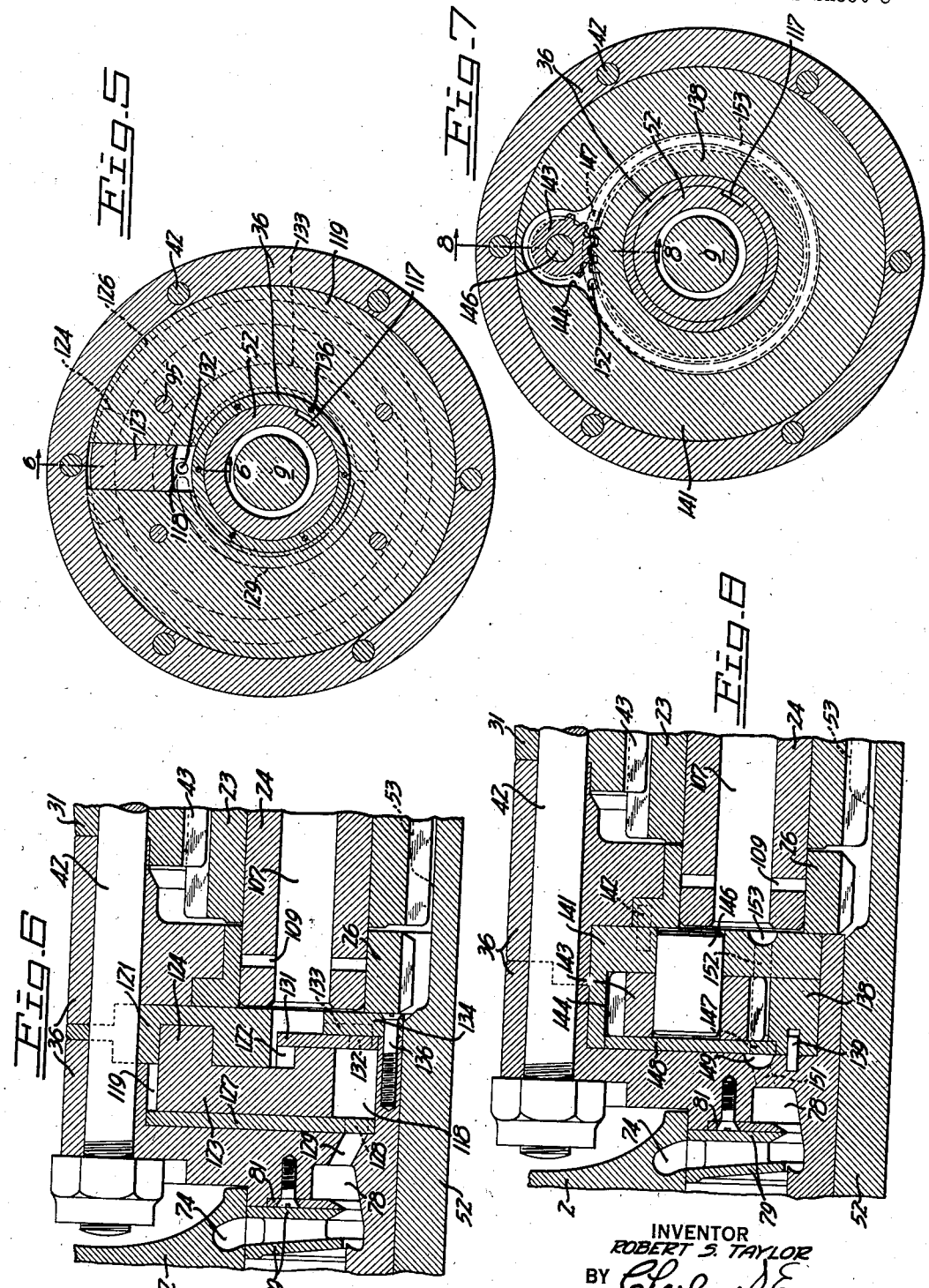

Patented Oct. 7, 1941

2,258,077

UNITED STATES PATENT OFFICE 2,258,077

OILING SYSTEM FOR GEARING

Robert S. Taylor, Seattle, Wash.

Application July 28, 1937, Serial No. 156,121

20 Claims. (Cl. 184—6)

My invention relates to the lubrication of gearing, such as the gearing of a speed change axle.

It is among the objects of my invention to provide a gearing having a stress train for transmitting torque from a drive to a driven part of the gearing, with an oil pump interposed in the stress train.

Another object of my invention is to provide an oil pump which is operable upon relative movement between the gear parts.

A more specific object of my invention is to provide a speed change axle having planetary and differential gear systems, with an oil pump for forcing oil to the bearing surfaces of the planet pinion and other parts of the gearing, and connected to operate upon planetary movement in the axle.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 5 is a transverse vertical sectional view taken in a plane similar to the section of Figure 3, showing a plunger type of pump; and Figure 6 is a longitudinal sectional view of the same, taken in a plane indicated by the line 6—6 of Figure 5.

Figure 7 is another view similar to the section of Figure 3, showing a gear type of pump; and Figure 8 is a longitudinal sectional view of the same, taken in a plane indicated by the line 8—8 of Figure 7.

Figure 1:
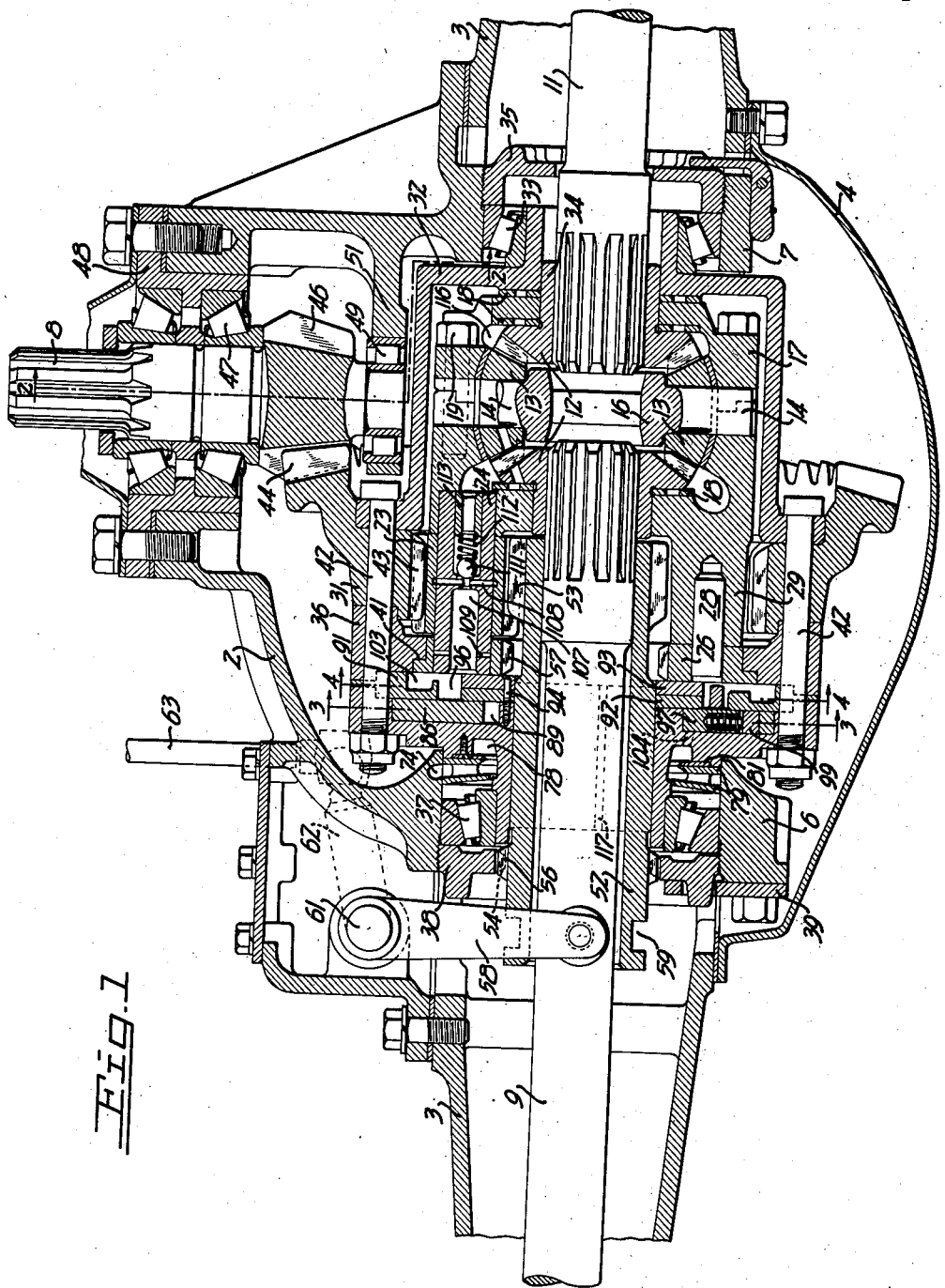
Figure 1 is a horizontal sectional view of a speed change axle embodying the oiling system of my invention.

In terms of broad inclusion, the oiling system embodying my invention comprises a gearing having relatively movable parts, and an oil pump for the gearing and operable upon relative movement between the gear parts. As applied to a speed change axle having a planetary gear system, my pump is preferably connected between the parts of the planetary system. A suitable pick-up is preferably provided for delivering oil from the housing to the intake side of the pump; and suitable passages are provided from the delivery side to feed the oil to the planetary and differential gear systems of the axle. Oil is preferably delivered to the differential casing by passages extended longitudinally through the planet pinion shafts. Transverse passages are also provided in the pinion shafts to supply oil to the pinion bearings; and spring pressed valves are preferably arranged in the longitudinal passages to force oil under pressure to the pinion bearings.

In greater detail, and referring to the drawings, the oiling system of my invention is described in connection with a speed change axle, it being understood however, that the oiling system may be used with other types of gearings. The axle comprises a specially constructed housing portion 2 mounted on the inner side of an ordinary axle housing 3 of an automobile. A cover plate 4 is also provided over the outer side of the housing 3 in the usual manner. Housing portion 2 is designed to carry the entire axle mechanism, and for this purpose is provided with a pair of annular end brackets 6 and 7 positioned within and in axial alignment with the axle housing 3. Drive shaft 8 which connects with the propeller shaft, projects into the housing portion 2; and the axle or driven shafts 9 and 11 project in through the annular supporting brackets 6 and 7. The housing provides a reservoir for lubricating oil in the usual manner.

A differential gear system is provided within the housing for connecting the axle shafts together. This system comprises a pair of differential gears 12 splined on the opposing ends of the axles, and connected by differential pinions 13 journaled on arms 14 of a spider 16. The core of the spider is annular in shape to provide a central opening for clearing ends of the axles. The differential assembly is enclosed in a casing 17 journaled on the hubs of gears 12 with suitable bearing plates 18 interposed between the casing and other parts. Differential casing 17 is split transversely along the pinion axis, and the halves of the casing are clamped about the arms 14 of the spider by suitable studs 19.

A planetary gear system is provided, connected with the differential system, and comprises a planet pinion 23 journaled on a shaft 24. One end of the pinion shaft is mounted on the differential casing 17, and the other end is carried by a bearing ring 26 encircling the axle shaft 9, Preferably several of these planet pinions are provided. At points intermediate the pinions the bearing ring 26 is rigidly fastened to the differential casing 17 by a pin 28 anchored in a lug portion 29 of the casing structure.

A rotor is provided for encasing both the planetary and differential gear systems, and comprises an annular central portion 31 encircling the planet pinions 23. The rotor also comprises a bell shaped end portion 32 surrounding the differential system and journaled at its outer end in a bearing 33 held by the bracket 7. Hub 34 of differential gear 12 is also journaled in this end of the rotor. A suitable retaining ring 35 is threaded into the outer end of bracket 7 to hold bearing 33, and also to keep the oil from running out this end of the housing.

The other end of the rotor comprises a two-part bell shaped portion 36, journaled at its outer end in a bearing 37 held by the bracket 6. A retaining ring 38 is also threaded into the outer end of this bracket, and is held securely by a strap 39 bolted to the bracket. End portion 36 of the rotor embraces the outer ends of pinion shafts 24, and provides a journal for the bearing ring 26; the actual journaling being in the inner part of rotor portion 36, between which an offset bearing surface 41 is preferably formed. Rotor sections 31, 32 and 36 are all secured together by bolts 42.

Suitable teeth are integrally formed on the inside of the central rotor section 31 to provide the ring gear 43 of the planetary system, meshed with planet pinion 23. Suitable teeth are also integrally formed on the outside of the central rotor section 31 to provide the master gear 44, meshed with driving pinion 46 on drive shaft 8. The latter is journaled in bearings 47 carried by a collar 48 bolted to housing portion 2. Additional support is provided for the driving pinion by a bearing 49 mounted on bracket 51. By this arrangement the rotor carrying ring gear 43 drives planet pinion 23 when the drive pinion 46 is rotating.

Means are provided for cutting the planetary system into and out of the drive. For this purpose a sleeve 52 is slidably mounted in the rotor section 36 and on the axle 9. The sleeve thus also serves as an oil seal for this end of the rotor. Sleeve 52 projects through the bearing ring 26 and has teeth formed on its inner end meshed with the planet pinion 23 to provide the sun gear 53 of the planetary system. Teeth 54 are also provided on the inside of the retaining ring or fixed element 38, and complementary teeth 56 are formed on sleeve 52 to mesh with teeth 54 of the fixed element.

When these latter teeth are meshed, as shown in Figure 1, sun gear 53 is held against rotation, and pinion 23 is caused to planetate about the sun gear when ring gear 43 is driven. Under these conditions the differential casing 17 is rotated with respect to the ring gear, and at a reduced speed.

Suitable teeth 57 are also formed on the inside of the bearing ring 26, with which the teeth of the sun gear 53 may mesh upon outward shifting of sleeve 52. When this shifting occurs, the teeth 56 move out of engagement with the teeth on the fixed element. Under these conditions the planet pinion 23 is prevented from rotating about its own axis, and the differential casing 17 and ring gear 43 are locked together for rotation as a unit. This gives a direct drive to the differential casing, and results in a speed which is higher than when the planetary system is functioning.

Means are provided for shifting the sleeve 52 to optionally engage it with either fixed element 38 (for the underdrive) or bearing ring 26 (for the direct drive). The shifting mechanism comprises a yoke 58 engaging an annular groove 59 in sleeve 52. Yoke 58 is mounted on a shaft 61 journaled in the housing, and the shaft is provided with a crank 62 connected with a suitable shifting lever in the driver's compartment by a connecting rod 63.

Figure 2:
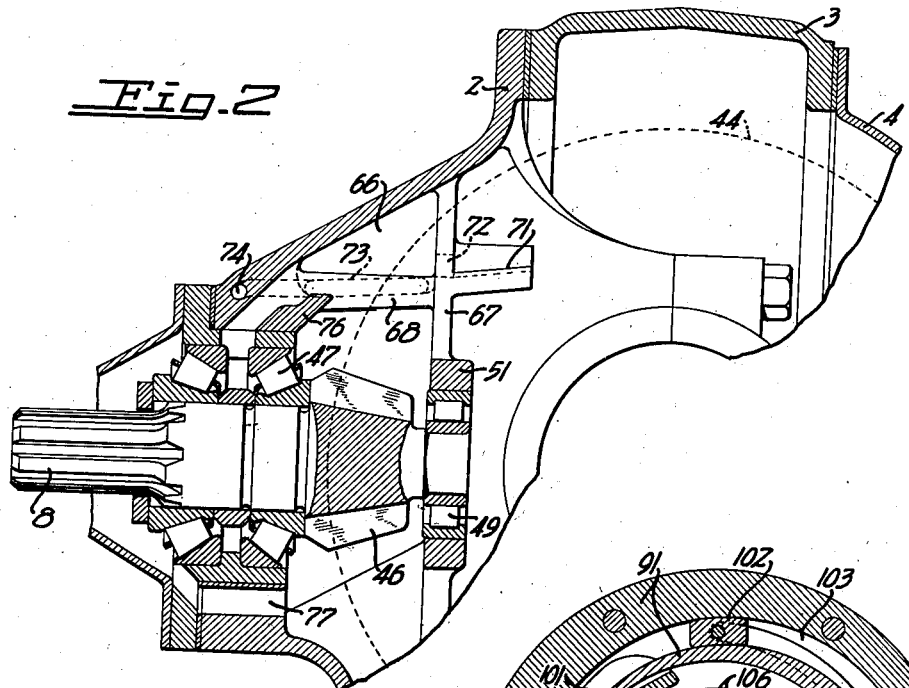
Figure 2 is a fragmentary vertical sectional view of the same, taken in a plane indicated by the line 2—2 of Figure 1, showing the oil pick-up.

The oiling system, which is the principal feature of my invention, includes suitable means for collecting oil and feeding it to one end of the rotor, preferably the end adjacent bracket 6. As shown in Figure 2, one type of collector may comprise an oil pocket 66 formed in the upper portion of the housing adjacent the master gear 44. The inner side of this pocket is formed by the supporting web 67 of bearing bracket 51; while the bottom of the pocket is formed by an inclined web 68 positioned behind web 67 and sloping downwardly toward the wall of the housing. This forms a triangular opening alongside the master gear, and into which oil picked up from the housing by the master gear is thrown. Additional oil is collected from the master gear by an inclined trough 71 projecting from the web 67 and directing oil into the pocket through a suitable hole 72 in the web.

Oil received by this pocket passes through an opening 73 in the wall of the housing and then flows by gravity around the housing wall through a passage 74 terminating on the inside surface of the bracket 6, see Figure 1. The oil collected by the pocket is thus discharged into the space between the end of the rotor and bearing 37. While I have described this particular type of oil pick-up, it is understood that any other suitable means may be used for collecting oil from the rotor and feeding it to the inside of bracket 6.

Another feature of the oil collector shown in Figure 2 is a lip 76 for directing a part of the oil down into the drive shaft bearings 47, from which the oil drains back into the housing through a passage 77.

The part of the oil which flows around the housing through passage 74 is collected at the end of the rotor in an annular groove 78. In order to direct the oil from passage 74 into the groove an oil guide comprising a pair of spaced plates 79 is fitted into the space between the rotor and bearing 37; and a bearing plate 81 is fastened to the end of the rotor to lie against the oil guide. This guide allows a certain amount of oil to creep out to bearing 37 to lubricate it, but keeps most of the oil in the groove 78.

Figure 3:
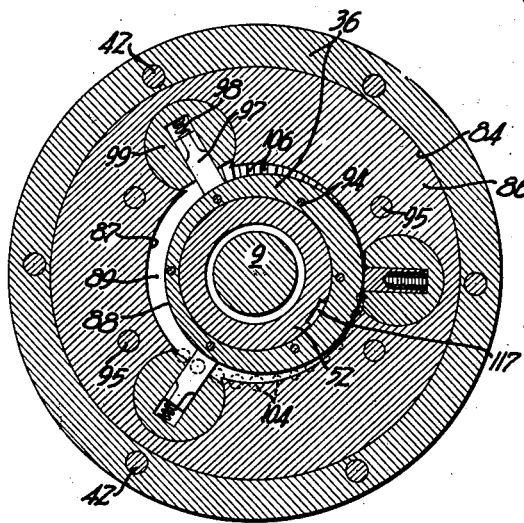
Figure 3 is a transverse vertical sectional view showing the oil pump, taken in a plane indicated by the line 3—3 of Figure 1.

An oil pump is provided inside of the rotor, between the end of the rotor and the bearing ring 26. As shown in Figures 1 and 3, the inner side of the end rotor section 36 is provided with an annular recess 84 in which an annular plate 86 is journaled. The inner circular edge 87 of this plate is concentric with the axis of the rotor, but the inner circular surface 88 of the rotor recess is eccentric with the rotor axis, forming a crescent shaped chamber 89 between these parts. Chamber 89 forms the pumping chamber, and this element of the pump is in effect mounted for rotation with the ring gear 43 of the planetary system, because when the ring gear rotates the pumping chamber shifts about the rotor axis.

Figure 4:
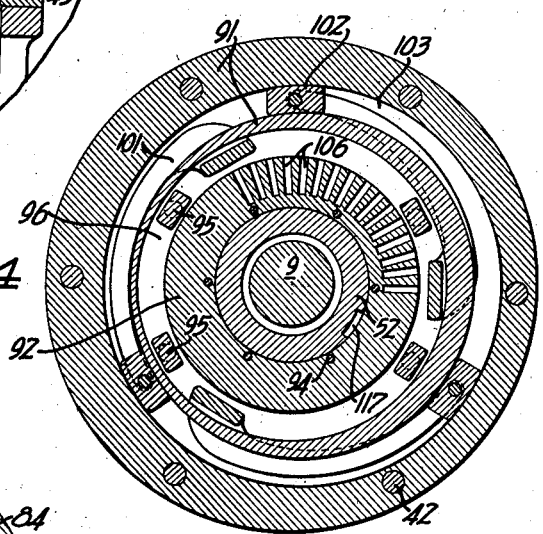
Figure 4 is a similar view showing the cam for holding the pump impellers radial to the eccentric pump surface, the plane of section being indicated by the line 4—4 of Figure 1.

Plate 86 of the pump structure is held in position in the recess by a ring 91 clamped between the parts of rotor portion 36, and also by a pair of rings 92 and 93 fastened to the rotor by screws 94. The latter rings are disposed adjacent the inner periphery of plate 86, and serve to close the inner side of the pumping chamber. Plate 86 is connected for rotation with outer ends of the planet pinions by studs 95 passing through the annular space 96 between rings 92—93 and ring 91, see Figure 4. These studs are pressed at one end into the pinion shaft bearing ring 26 and at the other end into plate 86. By this arrangement, plate 86 of the pump structure is connected for rotation with differential casing and planet pinion mounting, so that when the pinions planetate the plate 86 moves with them.

Impellers 97 are provided for the pump, and are mounted in the plate 86. Springs 98 behind the impellers serve to hold the latter against the eccentric surface 88 of the pumping chamber, so that when plate 86 rotates relative to the rotor, the impellers sweep through the pumping chamber.

Means are provided for holding the impellers substantially radially of the eccentric surface 88. For this purpose each impeller is mounted in a small rotor 99 journaled in plate 86, to which is fixed an arm 101 (Figure 4) having a shoe 102 riding in cam groove 103 in the side of ring 91. These impeller positioning arms extend substantially 90° around the circumference of the pump, and the cam groove follows an eccentric circle having the same center as the eccentric pumping chamber surface 88. By this arrangement the impellers are held substantially radially of the eccentric surface 88, although they rotate about a different center.

Oil is supplied to the pump from the groove 78 through a series of inlet apertures 104 extending through the rotor and connecting the groove with the intake end of the pump chamber. These apertures extend over about one-third of the pump circumference, and are indicated by dotted lines in Figure 3, although actually they are in front of the plane of section. This gives an intake of large volume to operate with the very heavy oil ordinarily used in these axles. The oil is then driven around the pumping chamber by the impellers and is discharged through outlets formed by slots 106 also extending over about one-third of the pump circumference, and cut in the inner ring 92 at the opposite side of the pump. Both the intake and discharge openings have more capacity than the displacement volume of the pump. The oil is forced by the pump into the annular space 96 between the pump and the pinion shaft bearing ring 26.

Pinion shafts 24 each have a longitudinal passage 107 extending longitudinally therethrough, communicating with the oil space 96. Transverse passages 108 are provided in the pinion shaft to feed oil to the planet pinion bearing, and transverse passages 109 are also provided for supplying oil to the end of the shaft journaled in bearing ring 26. In order to force the oil under pressure through passages 108 and 109, a spring pressed valve 111 is mounted in the longitudinal passage 107, so that the oil is pumped into the transverse passages against the spring pressure of the valve. A simple valve is shown, comprising a ball held against a valve seat by a spring 112 compressed by a sleeve 113.

Speed change axles have usually failed at the planet pinion bearing, because the pinion is a high speed element, and oiling systems in the past have not provided positive lubrication at this point. In my oiling system the lubricant is supplied to the pinion bearing surfaces under pressure, and ample lubrication is insured.

Another feature of my axle mechanism is that the pump, being actuated by relative rotation between the parts of the planetary system (or between parts of the planetary and differential systems), operates only when the planetary system is functioning; that is, when there is planetary movement between the ring gear and planet pinions, resulting in a relative rotation between the ring gear and differential casing. This means that the pump operates only when the pinions are planetating and need lubrication; and does not operate and is not being worn when the axle is driving direct, at which time the pinions do not require lubrication. The axle thus automatically controls the operation of the pump, and provides oil under pressure to the pinions only when they need it.

Oil that is pumped past the spring pressed valve 111 passes on through the pinion shaft and is discharged into the differential casing, where it serves to lubricate the differential gear system. Under the pumping pressure the oil circulates through the differential casing, and is preferably discharged into the rotor through a suitable opening 116 provided in the opposite end of the casing. From the rotor the oil may pass back into the housing through a suitable opening, such as indicated by the passage 117 cut in the sleeve 52. Thus a complete path for oil circulation is provided from the housing through the pump to the differential casing, and then through the rotor back to the housing.

Since the pump as I have shown it is designed primarily for oiling the planetary system, and operates only when the latter is functioning, it is understood that auxiliary means may be provided if desired for feeding oil into the rotor at all times. For example, a gravity flow into the end of the rotor opposite the pump may be employed. This would supply oil to the rotor when the axle is driving direct, in which case oil would flow into the differential casing from the rotor through the opening 116. However, since there is little relative movement in a differential, the oiling problem in such a system is not great, and the oil normally retained by the rotor and casing is usually sufficient for this lubrication; especially since the oil in the casing and rotor is recirculated each time the pump operates. It is understood therefore that my oiling system may be used either alone or in conjunction with another oiling system.

While the specific type of pump above described will give good results, it is obvious that other suitable pump structures may be employed. For example, a plunger pump may be used. Figures 5 and 6 show such a pump comprising a pumping chamber 118 formed by a groove provided in the inner surface of plate 119. In this construction the inner surface of the rotor recess is concentric, and the plate 119 provides a running fit with the inner and outer rim portions of the recess. The outer portions of plate 119 lie inside the retaining ring 121 while the lower portions extend out in a flange 122 to give greater width to the pumping chamber.

A piston 123 is slidably mounted in a radial groove which provides the pumping chamber 118; and the upper end of the piston carries an arcuate shoe 124 engaging an eccentric groove 126 in retaining ring 121. By this arrangement the piston moves into and out of the pumping chamber once during each revolution, forcing oil out of the chamber during the instroke and sucking oil into the chamber during the outstroke.

Flow of oil is controlled by an inlet opening 128 in the portion 127 of plate 119 which lies behind the groove and forms a side wall of the pumping chamber. During the suction stroke this opening registers with a slot 129 communicating with oil supply groove 78. Slot 129 extends 180° around the rotor as indicated by the dot and dash lines in Figure 5, it being understood that the slot actually lies in front of the plane of section of this view. This slot opening may be formed as a series of shorter slots or openings, to preserve the strength of the rotor wall.

A plate 131 is provided at the opposite side of the pumping chamber, and has an outlet opening 132 oppositely disposed from the inlet opening 128. This outlet opening registers with a groove 133 cut in the side of a retaining ring 134 fastened to the rotor by screws 136. This groove also extends 180° around the pump circumference, see Figure 5, so that the outlet opening 132 is in register with it during the discharge stroke. As shown in Figure 6, groove 133 opens out into the annular space adjacent the open ends of pinion shafts 24. Side plate 131 is of course mounted for rotation with the driven inner plate 119. Preferably suitable screws, not shown, are provided for fastening the plates together.

A gear type of oil pump is shown in Figures 7 and 8. In this construction an annular gear 138 is mounted in the rotor groove, and is fastened to the rotor by a key 139. Plate 141 encircles the gear and is journaled in the rotor recess. This plate runs with the differential casing, being connected to bearing ring 26 by suitable pins 142. A second pump gear 143 is mounted on plate 141 in a suitable recess 144, and is freely journaled on a stub shaft 146 and meshed with the center gear 138 of the pump. By this arrangement the pump operates whenever there is relative rotation between the rotor and differential casing, caused by planetation of the pinions about the ring gear.

An oil inlet opening 147 is provided in a plate 148 mounted behind the gears and fastened to plate 141 by suitable screws, not shown. This opening is positioned adjacent the intake side of the pump gears, and communicates with a groove 149 in the rotor and extends completely around the pump. This groove is connected with the oil groove 78 by a passage 151. Oil is thereby continuously supplied to the pump. The intake opening 147 is indicated by a dotted line in Figure 7, because the hole is actually in front of the plane of section of this view.

At the discharge side of the pump gears is an outlet opening 152 connected with a groove 153 formed in the outer surface of plate 141. This latter groove is positioned opposite the hollow pinion shafts 24, so that oil from the pump is driven into the shafts.

In each of the embodiments of my invention the combination of elements is the same; namely, an oil pump having one of its elements operably connected with a part of the planetary system, and another of its elements operatively connected with another part of the planetary system (or a part of the differential system). More broadly expressed, the combination comprises a stress train (including both planetary and differential gear systems) for transmitting torque from the driving part (drive pinion 8) to the driven part (axle shafts 9 and 11), and an oil pump for the gearing interposed in the stress train.

I claim:

1. A gearing comprising relatively rotatable parts, an oil pump for the gearing and comprising a pumping chamber rotatably connected with one part of the gearing, and a pumping element in the chamber and rotatably connected with another part of the gearing.

2. A speed change axle comprising a driving pinion, driven shafts, differential and planetary gear systems interposed between said pinion and shafts, and an oil pump comprising relatively movable elements, one of the pump elements being operatively connected with the planetary system and another of the pump elements being operatively connected with the differential system.

3. A gearing comprising a planetary gear system, and an oil pump for the gearing and operable only upon planetary movement between the parts thereof.

4. A gearing comprising a differential gear system, a planetary gear system connected therewith, and an oil pump for said gearing and operable only upon movement between parts of the planetary system.

5. A planetary gearing comprising a planet pinion, and an oil pump operable upon planetary movement between the parts of the planetary system for forcing oil under pressure to the pinion.

6. A planetary gearing comprising a ring gear, a planet pinion, and an oil pump comprising relatively movable elements for forcing oil under pressure to the pinion, one of the pump elements being operably connected with the ring gear and another of the pump elements being operably connected with the planet pinion.

7. A gearing comprising a differential gear system having a differential casing, a planetary gear system comprising a planet pinion, a shaft for the pinion and mounted on the differential casing, an oil passage through the pinion shaft and communicating with the interior of the differential casing, and means for feeding oil into said casing through said pinion shaft passage.

8. A gearing comprising a gear system including a hollow rotor, and an oil pump including relatively moving parts within the rotor for oiling the gear system and operatively connected with said system.

9. A gearing comprising a gear system including a hollow rotor for enclosing a part of the gear system, and an oil pump within the rotor for oiling the gear system and operatively connected between the rotor and said enclosed part of the system.

10. A gearing comprising a gear system including a hollow rotor for enclosing a part of said system, an oil pump comprising an annular element disposed about the rotor axis and providing a pumping chamber, a pumping element running in the pumping chamber, one of said pump elements being connected for rotation with said rotor, and an outlet for the pumping chamber discharging within said rotor.

11. A gearing comprising a housing, a shaft in the housing, a gear system connected with the shaft and including a rotor coaxial with the shaft and enclosing a part of said gear system, a pump for oiling the system and having an element rotatable relative to the rotor about the shaft axis, said pump element being operatively connected with the gear system, and an outlet for the pump discharging within said rotor.

12. A gearing comprising a housing, a shaft in the housing, a gear system connected with the shaft and including a rotor coaxial with the shaft and enclosing a part of said gear system, a pump within the rotor for oiling the system and having an element rotatable about the shaft axis, said pump element being operatively connected with the gear system, and an outlet for the pump discharging within said rotor.

13. In a planetary gearing having a shaft for carrying the planet pinion, a rotor enclosing said pinion and shaft, an oil passage in the pinion shaft, an oil pump having an element connected for rotation with the rotor, and an outlet for the pump for discharging oil into the rotor through said pinion shaft passage.

14. In a planetary gearing having a shaft for carrying the planet pinion, a rotor enclosing said pinion and shaft, an oil passage in the pinion shaft, means providing an annular passage within the rotor with which an end of the shaft passage communicates, an oil pump having an element connected for rotation with the rotor, and an outlet for the pump discharging within the rotor for delivering oil under pressure into said annular passage.

15. A speed change axle comprising a differential gear system having a differential casing, a planetary gear system comprising a planet pinion, a shaft for the pinion mounted on the differential casing, an oil passage through the pinion shaft and communicating with the interior of the differential casing, and an oil pump operatively connected with one of said gear systems for feeding oil into said casing through said pinion shaft passage.

16. A speed change axle comprising a pair of axle shafts, a differential gear system connecting the shafts and having a differential casing, a planetary gear system associated with the differential system and having a planet pinion shaft rotatable bodily about an axle shaft, a passage through the pinion shaft and communicating with the interior of the differential casing, and a pump having a pumping chamber disposed about an axle shaft and having a discharge port for delivering oil into the differential casing through said pinion shaft passage.

17. A speed change axle comprising a housing providing a reservoir for oil, a rotor within the housing, a differential gear system within the rotor and having a differential casing, a planetary gear system associated with the differential system and having a planet pinion shaft within the rotor, a passage through said shaft communicating with the interior of the differential casing, a pump for forcing oil into the casing through said shaft passage, an outlet in the casing for discharging oil from the casing into the rotor, and an outlet in the rotor for discharging oil from the rotor back into the housing.

18. A gearing comprising a planetary gear system having a planet pinion shaft rotatable bodily about an axis, an oil passage opening from one end of said shaft for delivering oil to the bearing surface of the planet pinion, an annular chamber disposed about said axis and communicating with the open end of the shaft passage, and a pump for feeding oil into said chamber.

19. In combination, a pumping chamber, an impeller rotatable about a main axis for movement through the chamber, said chamber having a wall disposed eccentrically to said axis, means for mounting the impeller for pivotal movement about a second axis spaced from the main axis, and means for moving the impeller about the second axis for maintaining it radial to said eccentric wall.

20. In combination, a crescent-shaped pumping chamber, a plurality of radially disposed impellers movable through the chamber, and inlet and outlet ports adjacent opposite ends of the chamber, said ports being arranged to provide intake and discharge openings extending through arcs each substantially equal to the arcuate distance between the impellers.

ROBERT S. TAYLOR.